(12) United States Patent
Kim et al.

(10) Patent No.: US 8,896,925 B2
(45) Date of Patent: Nov. 25, 2014

(54) MICRO-LENS ARRAY SHEET AND BACKLIGHT UNIT COMPRISING THE SAME

(75) Inventors: Yune-Hyoun Kim, Daejeon (KR); Sang-Choll Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/000,839

(22) PCT Filed: Mar. 14, 2012

(86) PCT No.: PCT/KR2012/001848
§ 371 (c)(1), (2), (4) Date: Aug. 21, 2013

(87) PCT Pub. No.: WO2012/124983
PCT Pub. Date: Sep. 20, 2012

(65) Prior Publication Data
US 2013/0329299 A1    Dec. 12, 2013

(30) Foreign Application Priority Data

Mar. 15, 2011 (KR) .................. 10-2011-0022910
Mar. 13, 2012 (KR) .................. 10-2012-0025766

(51) Int. Cl.
*G02B 27/10* (2006.01)

(52) U.S. Cl.
USPC ............................................ 359/619

(58) Field of Classification Search
USPC ............................. 359/619–630
See application file for complete search history.

(56) References Cited

U.S. PATENT DOCUMENTS

| | | | |
|---|---|---|---|
| 5,867,321 A | 2/1999 | Nakama et al. | |
| 6,970,288 B2 * | 11/2005 | Ebina et al. | 359/455 |
| 7,227,692 B2 * | 6/2007 | Li et al. | 359/619 |
| 8,379,311 B2 * | 2/2013 | Yun et al. | 359/619 |
| 2002/0034710 A1 | 3/2002 | Morris et al. | |
| 2003/0002871 A1 | 1/2003 | Ohmura | |
| 2006/0239008 A1 | 10/2006 | Kim et al. | |
| 2007/0242478 A1 | 10/2007 | Arima et al. | |
| 2010/0214514 A1 | 8/2010 | Lin et al. | |
| 2010/0238378 A1 | 9/2010 | Yamagishi et al. | |
| 2011/0019128 A1 | 1/2011 | Takata | |

FOREIGN PATENT DOCUMENTS

| | | |
|---|---|---|
| EP | 2230550 A1 | 9/2010 |
| JP | 3251150 B2 | 11/2001 |
| JP | 2003-4907 A | 1/2003 |
| JP | 2004-505306 A | 2/2004 |
| JP | 2005-107474 A | 4/2005 |
| JP | 2006-301582 A | 11/2006 |
| JP | 2010-85846 A | 4/2010 |
| JP | 2010085846 | 4/2010 |
| JP | 2010-217660 A | 9/2010 |

(Continued)

*Primary Examiner* — Mohammed Hasan
(74) *Attorney, Agent, or Firm* — Mckenna Long & Aldridge LLP (57) ABSTRACT

The present invention relates to a microlens array sheet with enhanced optical performance, and a backlight unit having same, and more specifically, to a microlens array sheet and a backlight unit having same, the microlens array sheet comprising: a base portion; and a plurality of microlenses formed on one surface of the base portion, wherein the plurality of microlenses have an irregular array, and the standard deviation of the distance between the mid points of two microlenses adjacent to each other is, 2-20% of the average pitch(p) between microlenses adjacent from the mid point of a selected microlens after selecting one of the microlenses.

14 Claims, 5 Drawing Sheets

(56) References Cited

FOREIGN PATENT DOCUMENTS

| KR | 10-2008-0094053 | A  | 10/2008 |
| KR | 10-0917975      | B1 | 9/2009  |
| KR | 10-2009-0126531 | A  | 12/2009 |
| WO | 02/10804        | A1 | 2/2002  |
| WO | 2006036032      | A1 | 4/2006  |
| WO | 2009/118946     | A1 | 10/2009 |

* cited by examiner

MICRO-LENS ARRAY SHEET AND BACKLIGHT UNIT COMPRISING THE SAME

This application is a 35 U.S.C. §371 National Stage Entry of International Application No. PCT/KR2012/001848, filed Mar. 14, 2012 and claims the benefit of priority to Korean Application Nos. 10-2011-0022910, filed Mar. 15, 2011 and 10-2012-0025766, filed Mar. 13, 2012, all of which are incorporated by reference in their entirety herein.

TECHNICAL FIELD

The present invention relates to a micro-lens array sheet and a backlight unit including the micro-lens array sheet, and more particularly, to a micro-lens array sheet on which micro lenses are arranged so as to reduce moiré patterns and improve optical characteristics and a backlight unit including the micro-lens array sheet.

BACKGROUND ART

Liquid crystal display devices are electronic devices for converting electrical signals generated from various devices into visual information by using variations in the transmissivity of liquid crystals caused by a voltage applied thereto. Owing to merits such as small size, light weight, and low power consumption, liquid crystal display devices have been considered substitutes for cathode ray tubes (CRTs) and are now used in most information processing apparatuses requiring display devices.

In such a liquid crystal display device, a voltage is applied to liquid crystals to change the molecular arrangement thereof and thus change optical characteristics of the liquid crystals such as birefringence, optical rotatory power, dichroism, and light scattering. That is, liquid crystal display devices modulate light using liquid crystals. Since liquid crystal display devices do not produce light themselves, additional light sources are necessary to illuminate liquid crystal device screens. Such illumination light sources are generally called backlight units.

Backlight units may be classified as edge-type backlight units and direct-type backlight units, according to the position of a light emitting lamp. Edge-type backlight units include a lamp at a side of a light guide panel that guides light emitted from the lamp. Edge-type backlight units are used in small liquid crystal display devices such as desktop computer monitors and laptop computers and are advantageous in terms of evenness of lighting, durability, and size reduction. On the other hand, direct-type backlight units are developed for application in display devices having 20-inch or larger screens. Such a direct-type backlight unit includes lamps arrayed under a liquid crystal panel to directly illuminate the entirety of the liquid crystal panel.

Linear light sources such as cold cathode fluorescent lamps (CCFLs) were previously widely used as lamps for backlight units. However, light emitting diodes (LEDs) are now widely used as lamps for backlight units due to merits thereof, such as good color reproductivity, environmental-friendliness, slimness and lightness, and low power consumption.

Figure 1:
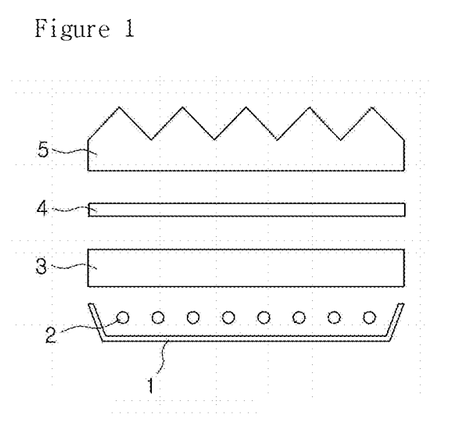
FIG. 1 is a schematic view illustrating an exemplary backlight unit.

Such a backlight unit may include a plurality of optical films for diffusing or collecting light emitted from a light source, improving brightness, or reducing uneven lighting known as "lamp mura." FIG. 1 is a view illustrating an exemplary direct type backlight unit of the related art. Referring to FIG. 1, a plurality of light sources 2 are arranged on a reflection plate 1, and a diffusion plate 3 is disposed above the light sources 2 to make the brightness of an entire screen uniform and support optical films. At least one diffusion film 4 and at least one condensing film 5 may be used for condensing light diffused by the diffusion plate 3 according to an effective visible range and improving the uniformity of screen brightness.

Figure 2:
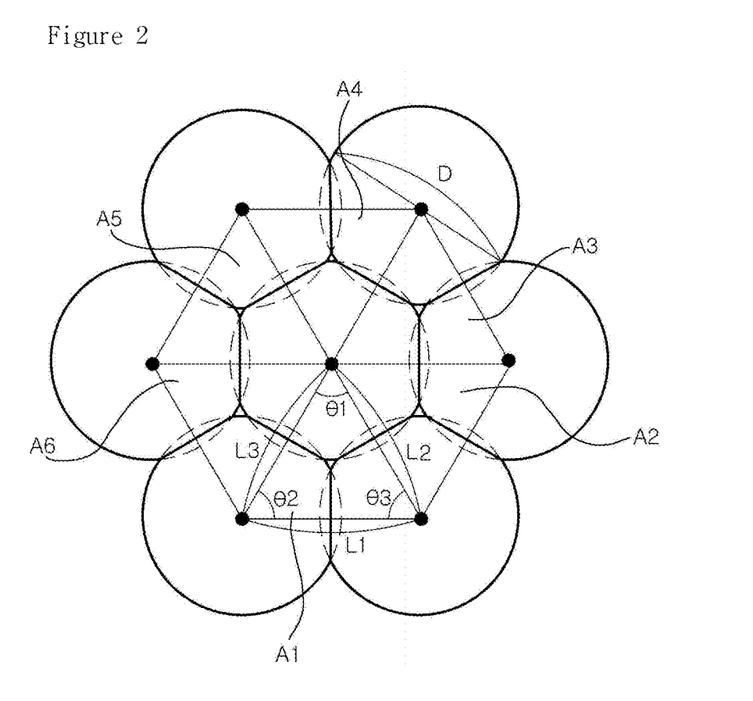
FIG. 2 is a bottom view illustrating a related art micro-lens array sheet having micro lenses arranged in a honeycomb pattern.

Examples of the condensing film include a prism film, a lenticular film, and a micro-lens array (MLA) sheet. The MLA sheet has a light condensing function as well as a light diffusing function. However, if micro lenses are periodically arranged on the MLA sheet as shown in FIG. 2, when the MLA sheet is superposed on another optical sheet having a periodic arrangement or pattern or an LCD panel having periodic pixels, a moiré pattern may occur due to geometric interference.

The term "moiré pattern" refers to an interference pattern generating when two or more patterns are superimposed on one another. For example, if two optical films having similar light and shade patterns are superimposed, a new light and shade pattern results, known as a "moiré pattern."

Since such an unnecessary pattern may be included in an image displayed on an LCD due to a moiré pattern, it is necessary to prevent or remove such a moiré pattern by a method such as removing periodicity from patterns that are superimposed. In this case, however, brightness can be remarkably reduced.

The brightness and viewing angles of image display devices are important characteristics and are known to be determined by the characteristics of backlight unit optical sheets. In recent years, hemispheric micro-lens array sheets have been widely used. However, such hemispheric micro-lens array sheets have limitations in improving brightness and result in decreases in brightness when increasing viewing angles.

Therefore, there is a need to develop a micro-lens array sheet comprising micro-lens arrangement having a moiré pattern occurrence while minimizing decreases in brightness.

DISCLOSURE

Technical Problem

An aspect of the present invention provides a micro-lens array sheet capable of reducing a moiré pattern while maintaining brightness.

Another aspect of the present invention provides a micro-lens array sheet including conic lenses for improving brightness and viewing angle characteristics.

Another aspect of the present invention provides a backlight unit including a micro-lens array sheet capable of reducing a moiré pattern and improving brightness and viewing angle characteristics.

Technical Solution

According to an aspect of the present invention, there is provided a micro-lens array sheet including: a base; and a plurality of micro lenses disposed on one side of the base, wherein the micro lenses are irregularly arranged, and a standard deviation in distances between centers of any two micro lenses adjacent thereto of the micro lenses is 2% to 20% of an average (p) of pitches measured from the center of any given micro lens to the centers of micro lenses adjacent thereto.

According to another aspect of the present invention, there is provided a backlight unit including the micro-lens array sheet.

The backlight unit may include two such micro-lens array sheets.

Advantageous Effects

As described above, according to the present invention, the micro lenses of the micro-lens array sheet are not periodically arranged to reduce a moiré pattern while minimizing decreases in brightness. In addition, if conic lenses are arranged on the micro-lens array sheet as micro lenses, both brightness and viewing angle characteristics can be improved. Therefore, if the micro-lens array sheet is used with a liquid crystal panel, a light and shadow pattern caused by a moiré pattern can be reduced, and thus high-quality images can be displayed.

BEST MODE

Exemplary embodiments of the present invention will now be described in detail with reference to the accompanying drawings.

The present invention relates to a micro-lens array sheet including: a base; and a plurality of micro lenses disposed on one side of the base, wherein the micro lenses are irregularly arranged, and a standard deviation in distances between centers of any two micro lenses adjacent thereto of the micro lenses is 2% to 20% of an average (P) of pitches measured from the center of any given micro lens to the centers of micro lenses adjacent thereto.

In a micro-lens array of the present invention, it is preferable that the standard deviation in distances between centers of any two micro lenses adjacent thereto of the micro lenses is 2% to 20% of an average (P) of pitches measured from the center of any given micro lens to the centers of micro lenses adjacent thereto. It is more preferably that the standard deviation is 2% to 14% of the average (P) of the pitches. It is most preferable that the standard deviation is 2% to 9% of the average (P) of the pitches. If the standard deviation is less than 2% of the average (P) of the pitches, the effect of reducing a moiré pattern is insufficient because the periodicity of the micro lenses is not sufficiently reduced. If the standard deviation is greater than 20% of the average (P) of the pitches, brightness reduces.

More preferably, according to the present invention, the micro lenses satisfy the above-mentioned range requirement and are irregularly arranged. If the micro lenses are regularly arranged, a moiré pattern may occur due to the periodicity of the micro lenses, even in the case that the micro lenses satisfy the above-mentioned standard deviation range requirement.

Furthermore, in the micro-lens array sheet of the present invention, it is preferable that the average (P) of the pitches ranges from 10 µm to 500 µm. If the pitch average (P) is less than 10 µm, it may be difficult to make lens manufacturing dies, and if the pitch average (P) is greater than 500 µm, the heights and volumes of the micro lenses increase to increase manufacturing costs, and the micro lenses can be easily seen by naked eyes and appearance quality may be lowered because light uniformity is lowered.

Preferably, as shown in FIG. 2, the micro lenses of the present invention may be arranged in a manner such that the centers of every three micro lenses adjacent thereto form a triangle as a basic array unit (from A1 to A6). In FIG. 2, L1, L2, and L3 refer to the lengths of the sides of the triangle, and θ1, θ2, and θ3 refer to the inside angles of the triangle.

In the present invention, the triangles formed by the centers of the micro lenses may have different areas.

It is preferable that the areas of the triangles (backlight units) vary from 2% to 20%. It is most preferable that the areas of the triangles (backlight units) vary from 2% to 9%. If the areas of the triangles vary by less than 2%, the effect of reducing a moiré pattern is insufficient because the periodicity of the micro lenses is not sufficiently reduced, and if the areas of the triangles vary by more than 20%, brightness reduces.

Furthermore, in the micro-lens array sheet of the present invention, 50% or less of the basic array units are regular-triangle basic array units. FIG. 2 illustrates micro lenses of a micro-lens array sheet of the related art. As shown in FIG. 2, in the micro-lens array sheet of the related art, micro lenses are regularly arranged in a honeycomb pattern so that regular triangles are formed by the centers of the micro lenses. However, if such micro-lens array sheets are superimposed on each other or such a micro-lens array sheet is superimposed on a liquid crystal display (LCD) panel having periodically arranged pixels, a moiré pattern may occur, and the image quality of an image display apparatus may be lowered. Thus, in the micro-lens array sheet of the present invention, the micro lenses are basically arranged in a triangular format, but the basic array units are varied to reduce a moiré pattern and prevent decreases in brightness. For effectively reducing a moiré pattern, it is preferable that 50% or less of the basic array units be regular-triangle basic array units.

It is more preferable that the basic array units do not include a regular-triangle basic array unit. In addition, the basic array units may satisfy the following Formula (1) or (2). For example, the basic array units may satisfy both the following Formulas (1) and (2).

$$0.8 \times P \leq L1, L2, L3 \leq 1.2 \times P \quad \text{Formula (1)}$$

$$48° \leq \theta1, \theta2, \theta3 \leq 72° \quad \text{Formula (2)}$$

In Formula (1), L1, L2, and L3 denote the lengths of the sides of each of the basic array units, and P denotes the average of the pitches between the micro lenses. In Formula (2), θ1, θ2, and θ3 denote the inside angles of each of the basic array units.

If the lengths of the sides of each of the basic array units are out of the range of 80% to 120% of the pitch average (P), brightness may decrease significantly, and if the inside angles of each of the basic array units are out of the range of 48° to 72°, brightness also decreases significantly.

In other words, if the micro lenses of the micro-lens array sheet are irregularly arranged in a random manner to reduce a moiré pattern, brightness may be significantly reduced. Therefore, in the present invention, the micro lenses are irregularly arranged in a limitedly random manner within the above-mentioned ranges so as to reduce a moiré pattern occurrence while minimizing decreases in brightness.

In addition, the micro lenses of the present invention may have a shape selected from the group consisting of a hemispheric shape, a cone shape, a conic shape, and an elliptic shape. However, the shapes of the micro lenses are not limited thereto. For example, the micro lenses may have other shapes such as a polygonal pyramid shape, a truncated polygonal pyramid shape, and an aspherical shape.

In addition, the average diameter (D) of the micro lenses may be 90% to 126% of the pitch average. If the average diameter of the micro lenses is less than 90% of the pitch average, brightness is low like in the case of a general micro-lens array sheet. If the average diameter of the micro lenses is greater than 126% of the pitch average, the average diameter of the micro lenses is greater than a diameter at which the void fraction of the micro lenses is zero. That is, in this case, the micro lenses may not be sufficiently convex.

The micro lenses disposed on the base of the micro-lens array sheet may have different bottom side diameters (D). However, it may be preferable that the micro lenses have the same bottom side diameter. If the micro lenses have the same bottom side diameter, the random arrangement of the micro lenses can be easily adjusted to reduce a moiré pattern while minimizing decreases in brightness.

Furthermore, in the present invention, it is preferable that the heights of the micro lenses range from 20% to 100% of the average pitch (P). If the heights of the micro lenses are less than 20% of the average pitch (P), brightness is low, as in the case of a general micro-lens array sheet. If the heights of the micro lenses are greater than 100% of the average pitch (P), it is difficult to manufacture for the micro lenses, and brightness may also be low like in the case of a general micro-lens array sheet. The micro lenses may have different heights. However, if the micro lenses have the same height, the random arrangement of the micro lenses can be easily adjusted to reduce a moiré pattern while minimizing decreases in brightness.

The micro lenses of the present invention may be conic lenses. Herein, the term "conic lens" means any lens having a circular bottom side and a hyperbolic or parabolic central vertical section. However, a cone-shaped lens having a triangular central vertical section, a hemispheric lens having a semicircular central vertical section, and an elliptic lens having an elliptic central vertical section are not conic lenses.

The shape of each conic lens may be expressed by the following Formula (3) where H denotes a height from a bottom side to an imaginary apex of the conic lens, r denotes a radius of curvature at the top of the conic lens, and k denotes a conic constant. Generally, the shape of a curved lens is expressed by a function having a radius of curvature (r) at the top of the lens as a variable and a conic constant (k) as a variable. The conic constant (k) is a factor for determining the shape of a lens. If k=0, a lens has a circular shape. If k=−1, a lens has a parabolic shape. If −1<k<0, a lens has an elliptical shape. If k<−1, a lens has a hyperbolic shape.

$$y = H - \frac{x^2/r}{1 + \sqrt{1 - (1+k)(1/r)^2 x^2}} \quad \text{Formula (3)}$$

In the present invention, it is preferable that the conic constant (k) of the conic lenses ranges from −3 to −1. It is more preferable that the conic constant (k) of the conic lenses ranges from −2.8 to −1.5.

In addition, it is preferable that the radius of curvature (r) of the conic lenses ranges from 0.2% to 26% of the pitch average (P). It is more preferable that the radius of curvature (r) of the conic lenses ranges from 2% to 20% of the pitch average (P). If the radius of curvature (r) of the conic lenses is less than 0.2% of the pitch average (P), the tops of the conic lenses may be damaged in a manufacturing process. If the radius of curvature (r) of the conic lenses is greater than 26% of the pitch average (P), light condensing efficiency may be low.

Figure 3:
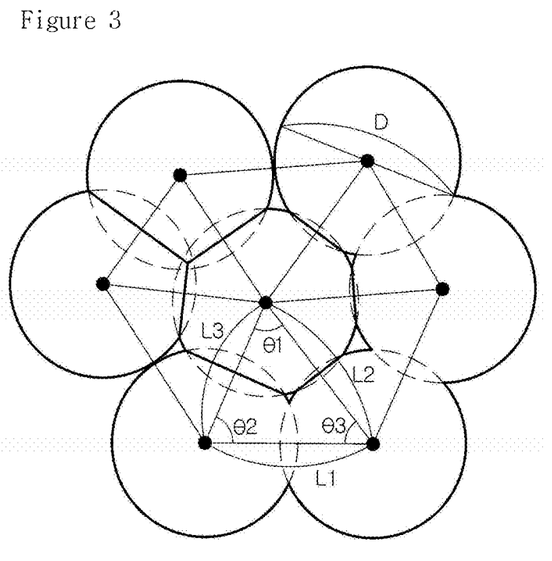
FIG. 3 is a schematic bottom view illustrating an exemplary micro-lens array sheet having micro lenses arranged randomly within a predetermined region according to an embodiment of the present invention.
Figure 4:
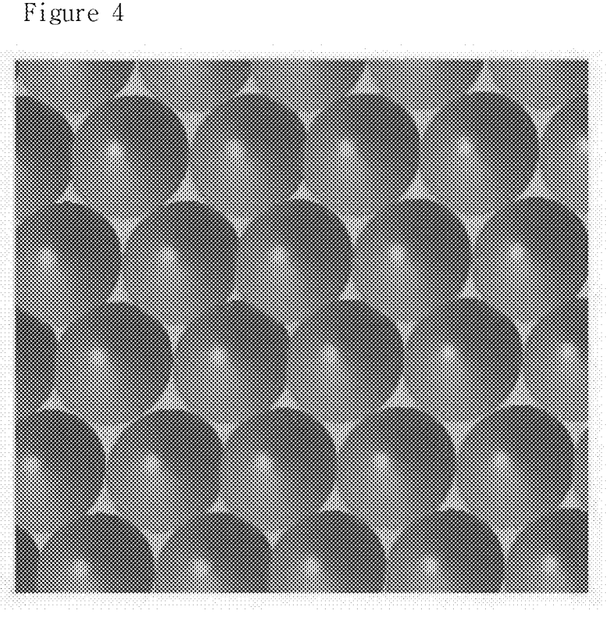
FIG. 4 is a perspective view illustrating a micro-lens array sheet having an arrangement such as that as shown in FIG. 3.
Figure 5:
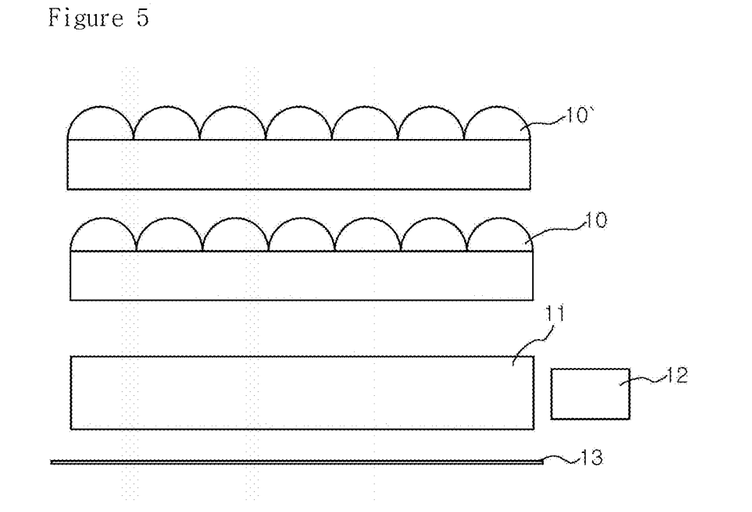
FIG. 5 is a schematic view illustrating a backlight unit according to an embodiment of the present invention.

Exemplary micro-lens arrays of the present invention are shown in FIGS. 3 and 4. FIG. 3 illustrates an exemplary arrangement of micro lenses having circular bottom sides, and FIG. 4 illustrates an exemplary micro-lens array sheet on which micro lenses are arranged according to an embodiment of the present invention.

Next, an explanation of a method for manufacturing a micro-lens array sheet will be given according to an embodiment of the present invention.

Since methods for manufacturing a micro-lens array sheet using dies are well known in the related art, those of ordinary skill in the art may easily manufacture a micro-lens array sheet of the present invention based on the present disclosure and the related art.

For example, the micro-lens array sheet of the present invention may be manufactured by: forming a film-shaped base through an extrusion process using a material such as a thermoplastic resin to form a base; forming a pattern on a light-exiting side of the base by rolling a roll engraved with a lens pattern along the base or injecting a curable resin between the base and a plate-shaped die; and curing the base by ultraviolet rays or heat.

In addition, conic lenses may be formed on the base by placing a die engraved with a conic lens pattern above the base, supplying a curable resin solution between the base and the die, and curing the resin solution. In addition, conic lenses may be formed on the base by a method such as a method of using asymmetric beads, a mask etching method using a laser, a direct machining method, and a photolithography method.

Examples of a curable resin that can be used in the present invention include: urethane acrylates, epoxy acrylates, ester acrylates, and radical generating monomers. Such resins may be used alone or in combination. However, the present invention is not limited thereto. Lenses having various shapes, heights, and pitches can be formed by using dies engraved with various patterns.

A die may be engraved with a lens pattern by a well-known method such as a mechanical cutting method, a photoresist reflow method, a photoresist laser exposure method, a bead coating method, or a laser etching method. Such a die may have a plate shape, a caterpillar shape, or a drum shape and may be formed of a metal such as nickel and chrome, a hard material such as a ceramic material, or a polymer film coated with a polymer or silica.

In addition, the present invention relates to a backlight unit using the micro-lens array sheet. The backlight unit includes a light source unit and at least one micro-lens array sheet disposed above the light source.

The above-described micro-lens array sheet is included in the backlight unit. The micro-lens array sheet is disposed between the light source unit and a liquid crystal panel for displaying images on a liquid crystal display device.

If the backlight unit is an edge type backlight unit, the micro-lens array sheet may be disposed between a light guide plate and the liquid crystal panel. If the backlight unit is a direct type backlight unit, the micro-lens array sheet may be disposed between the light source unit and the liquid crystal panel, for example, above a diffusion plate. A reflection plate having high reflectivity may be disposed under the light source unit to reuse light incident from the bottom side of the micro-lens array sheet. If the backlight unit is an edge type backlight unit, the reflection plate may be disposed under the light guide plate.

The backlight unit of the present invention may include an additional optical film as well as the micro-lens array sheet. The additional optical film may be a well-known optical film such as a diffusion film and a condensing film. That is, one or more such optical films may be used if necessary.

In addition, the backlight unit may include two micro-lens array sheets.

Hereinafter, specific examples will be given for further understanding of the present invention.

EXAMPLE 1

Condensing films each having two-dimensionally arranged micro conic lenses were formed. The conic lenses satisfied the following conditions: diameter D=55 μm, r=3 μm and k=−2.18 in Formula 3, honeycomb arrangement with pitch (P)=50 μm, standard deviation in distances between the centers of any two neighboring conic lenses=2.3 μm, and area variation of triangular basic array units=4.5%.

EXAMPLE 2

Condensing film having two-dimensionally arranged micro conic lenses was formed under the same conditions as those of Example 1 except that: standard deviation in distances between the centers of any two neighboring conic lenses=9.2 μm, and area variation of triangular basic array units=18.5%.

COMPARATIVE EXAMPLE 1

Condensing film having two-dimensionally arranged micro conic lenses was formed under the same conditions as Example 1 except that the conic lenses were regularly arranged.

COMPARATIVE EXAMPLE 2

Condensing film having two-dimensionally arranged micro conic lenses was formed under the same conditions as those of Example 1 except that: standard deviation in distances between the centers of any two neighboring conic lenses=0.6 μm, and area variation of triangular basic array units=1%.

Figure 6:
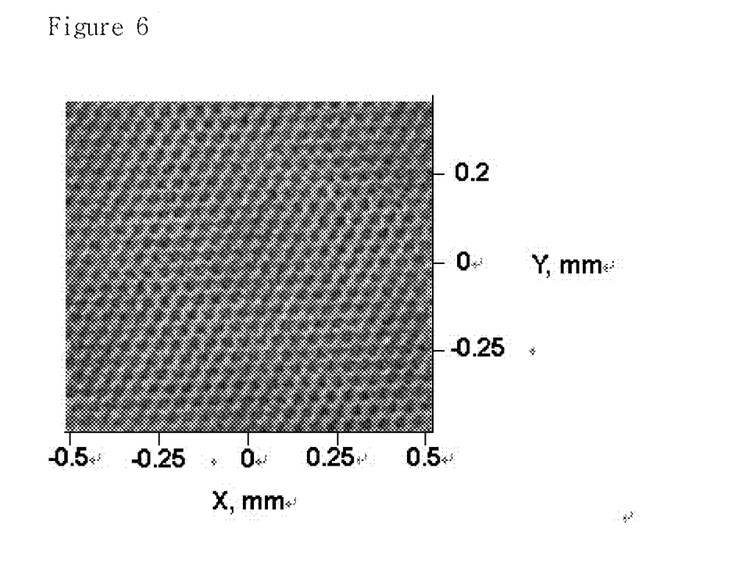
FIG. 6 is a moiré pattern image captured using LightTools by Optical Research Associates from two condensing films superimposed on each other with a twist angle of about 5° therebetween, according to Example 1.
Figure 7:
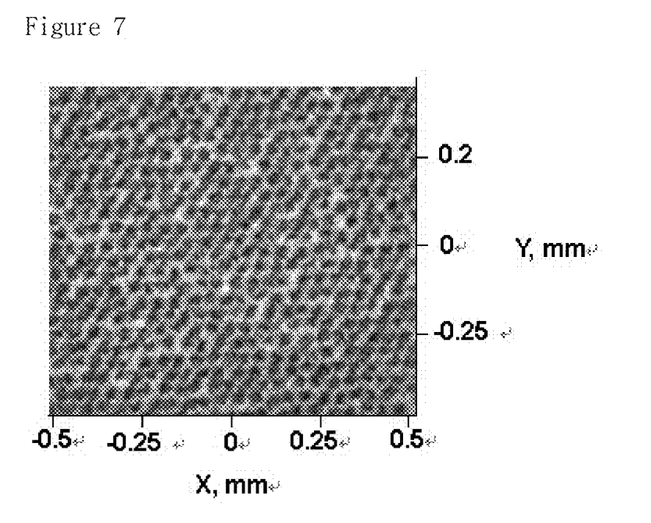
FIG. 7 is a moiré pattern image captured using LightTools by Optical Research Associates from two condensing films superimposed on each other with a twist angle of about 5° therebetween according to Example 2.
Figure 8:
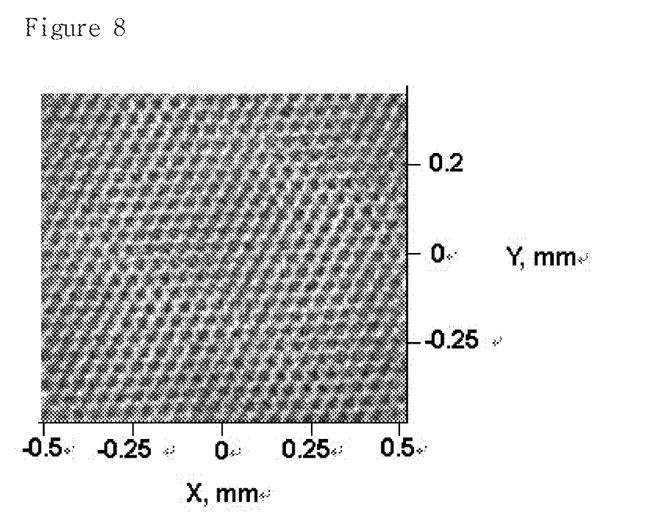
FIG. 8 is a moiré pattern image captured using LightTools by Optical Research Associates from two condensing films superimposed on each other with a twist angle of about 5° therebetween according to Comparative Example 1.
Figure 9:
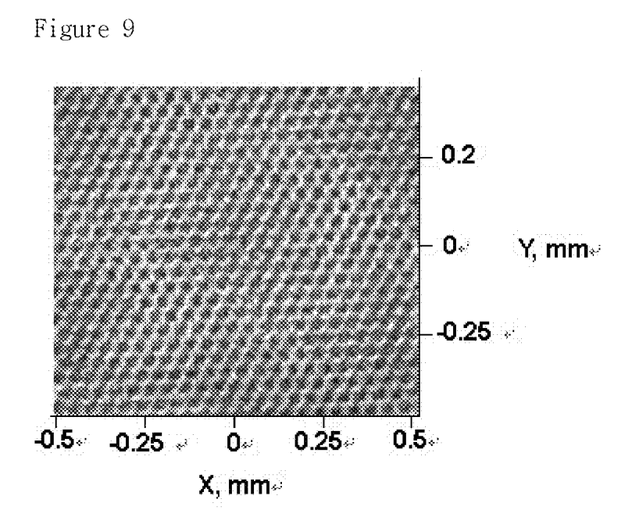
FIG. 9 is a moiré pattern image captured using LightTools by Optical Research Associates from two condensing films superimposed on each other with a twist angle of about 5° therebetween according to Comparative Example 2.

Two condensing films prepared in each of Examples 1 and 2 and Comparative Examples 1 and 2 were placed on a backlight unit with a twist angle of about 5° between the two condensing films, and central brightness and moiré pattern characteristics were simulated using a Ray-tracing program (LightTools by Optical Research Associates). Simulated brightness values are shown in Table 1 below. Simulated moire characteristics of Examples 1 and 2 are shown in FIGS. 6 and 7, respectively, and simulated moiré characteristics of Comparative Examples 1 and 2 are shown in FIGS. 8 and 9, respectively.

According to the simulation results, the lens arrangements of the present invention (Examples 1 and 2) result in fewer decreases in brightness and moiré pattern formation as compared with regular lens arrangements.

TABLE 1

| | Central Brightness | |
|---|---|---|
| | Absolute Values [a.u.] | Percentage [%] |
| Comparative Example 1 | 68.5 | 100.0 |
| Comparative Example 2 | 68.5 | 100.0 |
| Example 1 | 68.1 | 99.4 |
| Example 2 | 67.0 | 97.8 |

[Symbol Description]
D: diameter
L1, L2 and L3: length of the sides of each of a basic array unit
θ1, θ2 and θ3: inside angle of each of a basic array unit
A1 to A6: basic array unit
10, 10': a micro-lens array sheet
11: a light guide plate
12: a light source
13: a reflection plate

The invention claimed is:

1. A micro-lens array sheet comprising:
a base; and
a plurality of micro lenses disposed on one side of the base and being irregularly arranged,
wherein an average (P) of pitches is an average of distances measured from a center of any given micro lens of the plurality of micro lenses to centers of micro lenses adjacent thereto,
wherein a standard deviation in distances between the center of any given micro lens and the centers of micro lenses adjacent thereto is 2% to 20% of the average (P) of pitches.

2. The micro-lens array sheet of claim 1, wherein the average (P) of the pitches ranges from 10 μm to 500 μm.

3. The micro-lens array sheet of claim 1, wherein the centers of every three micro lenses adjacent thereto of the micro lenses form a triangle as a basic array unit, and the areas of the basic array units vary in a range of 2% to 20%.

4. The micro-lens array sheet of claim 3, wherein 50% or less of the basic array units are regular-triangle basic array units.

5. The micro-lens array sheet of claim 4, wherein the basic array units satisfy the following Formula (1):

$$0.8 \times P \leq L1, L2, L3 \leq 1.2 \times P \quad \text{Formula (1)}$$

where L1, L2, and L3 denote lengths of sides of each of the basic array units, and P denotes the average of the pitches between the micro lenses.

6. The micro-lens array sheet of claim 4, wherein the basic array units satisfy the following Formula (2):

$$48° \leq \theta1, \theta2, \theta3 \leq 72° \quad \text{Formula (2)}$$

where θ1, θ2, and θ3 denote inside angles of each of the basic array units.

7. The micro-lens array sheet of claim 4, wherein the basic array units satisfy the following Formulas (1) and (2):

$$0.8 \times P \leq L1, L2, L3 \leq 1.2 \times P \quad \text{Formula (1)}$$

$$48° \leq \theta1, \theta2, \theta3 \leq 72° \quad \text{Formula (2)}$$

L1, L2, and L3 denote lengths of sides of each of the basic array units, P denotes the average of the pitches between the micro lenses, and θ1, θ2, and θ3 denote inside angles of each of the basic array units.

8. The micro-lens array sheet of claim 4, wherein the micro lenses have a shape selected from the group consisting of a hemispheric shape, a cone shape, a conic shape, and an elliptic shape.

9. The micro-lens array sheet of claim 4, wherein the micro lenses have an average diameter ranging from 90% to 126% of the average (P) of the pitches between the micro lenses.

10. The micro-lens array sheet of claim 4, wherein the micro lenses have circular bottom sides having the same diameter.

11. The micro-lens array sheet of claim 4, wherein the micro lenses have heights ranging from 20% to 100% of the average (P) of the pitches between the micro lenses.

12. The micro-lens array sheet of claim 1, wherein the micro lenses are conic lenses characterized by the following Formula (3):

$$y = H - \frac{x^2/r}{1 + \sqrt{1 - (1+k)(1/r)^2 x^2}} \quad \text{Formula (3)}$$

where H denotes a height from a bottom side to an imaginary apex of each conic lens, k denotes a conic constant, r denotes a radius of curvature at a top of each conic lens, and the conic constant (k) ranges from −3 to −1.

13. The micro-lens array sheet of claim 12, wherein the radius of curvature (r) ranges from 1 μm to 10 μm.

14. A backlight unit comprising the micro-lens array sheet of claim 1.

* * * * *